United States Patent

Bate et al.

[15] 3,702,991

[45] Nov. 14, 1972

[54] MAGNETIC DOMAIN MEMORY STRUCTURE

[72] Inventors: Robert Thomas Bate, Richardson; Forrest Gerome West, Jr., Dallas, both of Tex.

[73] Assignee: Texas Instruments Incorporated, Dallas, Tex.

[22] Filed: March 30, 1971

[21] Appl. No.: 129,423

[52] U.S. Cl. ........................340/174 TF, 340/174 SR

[51] Int. Cl. ..........................G11c 11/14, G11c 19/00

[58] Field of Search ..................340/174 TF; 317/235

[56] References Cited

OTHER PUBLICATIONS

Electronics, " Magnetic Bubbles– a Technology In the Making" by Karp, 9/69, pages 83– 87.

Bell Laboratories Record, " The Magnetic Bubble" by Bobeck, June/July 1970, p 163– 170.

*Primary Examiner*—Stanley M. Urynowicz, Jr.

*Attorney*—James O. Dixon, Andrew M. Hassell, Harold Levine, Melvin Sharp, Michael A. Sileo, Jr., John E. Vandigriff, Stephen S. Sadacca, Richard L. Donaldson and James B. Hinson

[57] ABSTRACT

A magnetic memory structure is disclosed that includes a plurality of insulated gate field effect transistors (IGFET's) on one surface of a semiconductor substrate. A predetermined pattern of propagating material overlies the IGFET devices, and a layer of magnetic material capable of supporting cylindrical magnetic domains is mechanically attached to the structure to overlie the propagating material.

11 Claims, 21 Drawing Figures

INVENTORS
Forrest Gerome West, Jr.
Robert Thomas Bate

Richard L. Donaldson
ATTORNEY

MAGNETIC DOMAIN MEMORY STRUCTURE

This invention pertains to memory systems in general and, more particularly, to a memory system in which data are stored by manipulation of cylindrical magnetic domains in thin ferromagnetic platelets.

A cylindrical magnetic domain or magnetic bubble is a region of magnetic material having a magnetization reversed from that of the surrounding regions and separated therefrom by a continuous domain wall. The diameter of the domain is a function of both the material parameters and the amplitude of the bias field utilized to contract the domain. In other words, the cylindrical magnetic domain is essentially independent of the boundary of the magnetic material in the plane in which it is formed and may be moved anywhere in the plane of the magnetic material to effect various logic operations. The bubbles can be manipulated by programming currents through a pattern of conductors positioned adjacent the magnetic material or by varying the surrounding magnetic field. As an example, the magnetic domain or bubbles may be formed in thin platelets having uniaxial anisotropy with the easy magnetic axis perpendicular to the plate, such as rare earth orthoferrite and rare earth aluminum and gallium substituted iron garnets. Since the magnetic bubbles can be propagated, erased, replicated, and manipulated to form logic operations, and their presence and absence detected, these bubbles may be utilized to perform many of the ON-OFF or primary functions vital to computers.

Magnetic bubble memory systems offer significant advantages since logic, memory, counting and switching may all be performed within a single layer of solid magnetic material. This is in contrast to conventional memory systems in which information must move from one device to another through interconnecting conductors and high gain amplifiers. In addition, the actual magnetic material, such as magnetic tape, disk or drum, is transported past sensing and writing devices to effect data operations. In a magnetic bubble memory, however, these functions may all be effected within one continuous ferromagnetic medium and costly interfaces eliminated. The magnetic bubbles representing the data move in a plane of thin sheets of magnetic material such as orthoferrite crystals, for example, and they can be shifted into precisely defined positions at high speeds with little energy. The magnetic material itself remains stationary. With the advent of mixed rare earth aluminum or gallium substituted iron garnets which are capable of providing bit density in the order of $10^6$ per square inch, the development of a reliable solid state serial memory equivalent of magnetic disk files or drums has become a particularly attractive and realistic concept.

To date, several significant problems are associated with memory systems utilizing magnetic bubbles. One of the problems associated with a magnetic bubble memory results from the fact that it is difficult to obtain a sufficient quantity of good magnetic bubble material. This problem is compounded when devices must be built on the material to determine whether or not the material is of sufficient quality to operate in a memory system and, in addition, propagating patterns, contacts, etc. are made to the magnetic material thus rendering corresponding areas of the material unsuitable for bubble propagation.

A second problem associated with such memory systems pertains to detecting the presence or location of the magnetic bubbles with sufficient sensitivity. This problem is particularly acute when extremely small magnetic bubbles are used, such as those present in magnetic garnets such as aluminum and gallium substituted iron garnets. Bubble detection may be implemented in a variety of ways as discussed in more detail in W. Strauss, Paper AA-1 "Detection of Cylindrical Domains," 16th Annual Conference on Magnetism and Magnetic Materials, Miami, Florida, Nov. 16–20, 1970.

Accordingly, it is an object of the present invention to develop a reliable, inexpensive solid-state magnetic bubble equivalent of a disk file memory.

Another object of the invention is to provide a magnetic bubble memory system compatible with batch fabrication techniques.

A further object of the invention is to provide a magnetic bubble memory structure in which logic functions are controlled by IGFET devices.

Still another object is to provide a magnetic bubble memory system having improved detection output levels.

A further object of the invention is to provide a magnetic bubble memory system wherein control elements may be positioned away from defects in the magnetic bubble material.

Still another object of the present invention is to provide a magnetic bubble memory system wherein control elements and related circuits are formed on a structure entirely separate from the magnetic bubble material.

One aspect of the present invention is embodied in a magnetic bubble memory system characterized by complete IGFET circuit integration to provide gain, impedance conversion, shaping, and strobing on a single slice of silicon. For example, IGFET devices are formed on the surface of a silicon substrate, and patterned electrical conductors for bubble propagation are formed over the IGFET circuit devices. Magnetic bubble material is mechanically secured to the substrate and elements formed thereon to complete a unitary memory structure. In another embodiment, a passive magnetic film structure is formed to overlay the IGFET circuit devices and a thin layer of magnetic garnet material is brought into mechanical contact with the semiconductor slice, and elements formed thereon to provide a memory structure. Conventional IGFET fabrication techniques are utilized to form magnetic field sensors on a silicon slice. Approximately ten sensors with associated amplifiers and bubble generators per square inch provide storage on the order of $10^6$ bits of data.

FIG. 1 is a partially broken away, greatly enlarged, perspective view of one embodiment of the memory system of the present invention.

FIGS. 2*a* and 2*b* are schematics of propagation patterns in accordance with one embodiment of the present invention.

FIGS. 3*a* 3*b* are schematics of complementary structures that may be utilized for simple closed storage rings in accordance with an embodiment of the present invention.

FIGS. 4*a*–4*e* are schematics of multiple drain IGFET detector circuits and operating characteristics thereof.

FIG. 5 is a pictorial illustration of one type of IGFET magnetic field detector that may be utilized in accordance with the present invention.

FIG. 6 pictorially and schematically depicts an IGFET magnetic field detector configuration that may be utilized in accordance with one embodiment of the present invention.

FIGS. 9*a*–9*d* schematically and in block diagram format illustrate a memory system in accordance with an embodiment of the invention.

Figure 10:
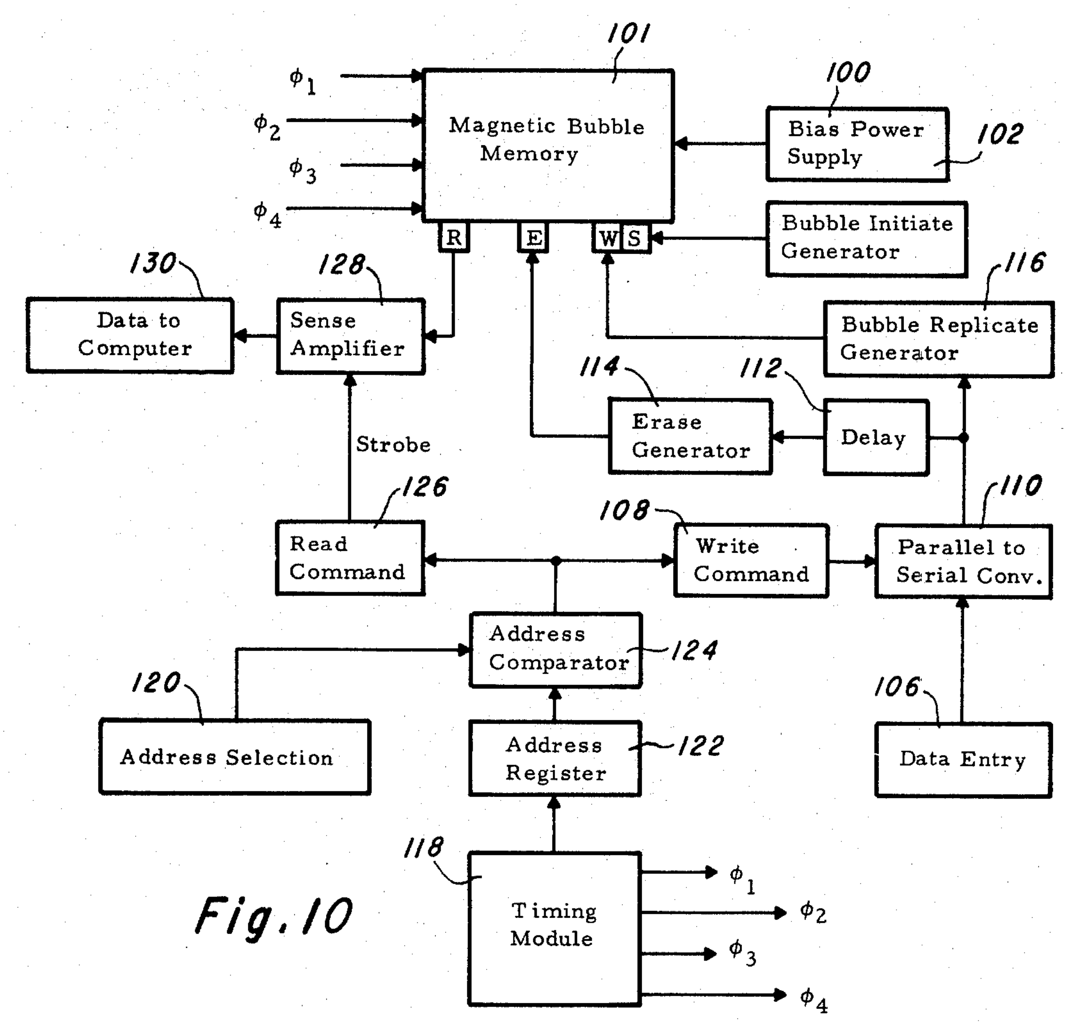

FIG. 10 is a functional block diagram of memory electronics of one embodiment of the invention.

Figure 11:
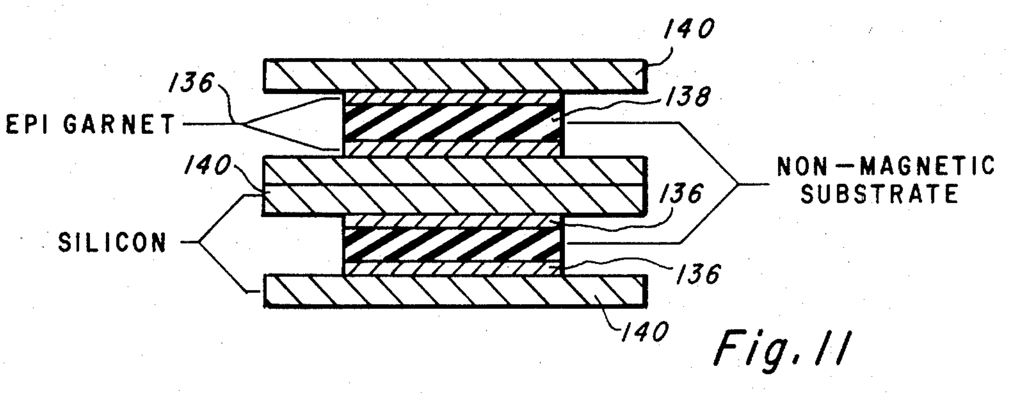

FIG. 11 is a sectional view illustrating stacked memory planes in accordance with a different embodiment of the present invention.

Figure 12:
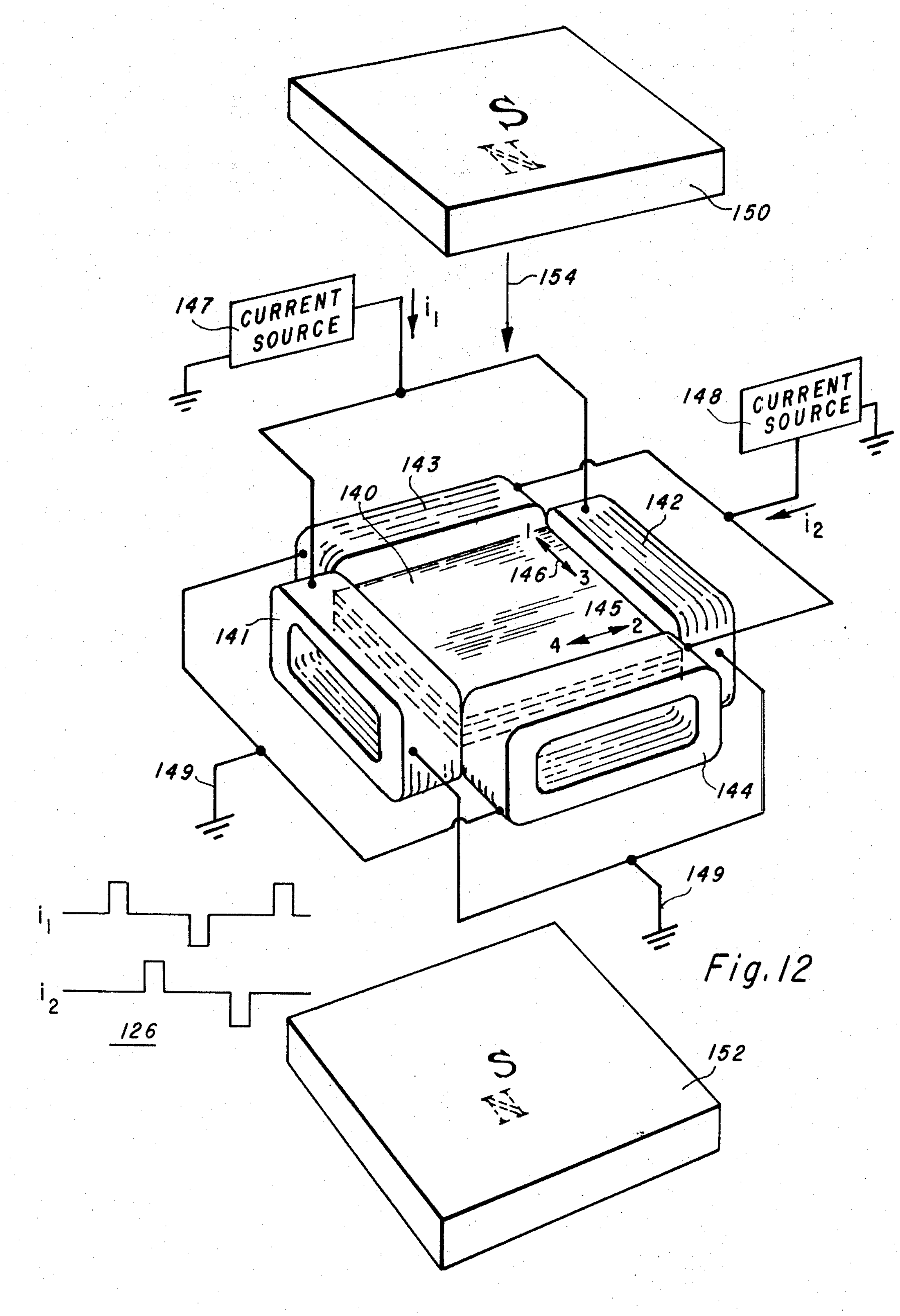

FIG. 12 is a pictorial illustration of an arrangement for producing the required magnetic fields in accordance with the present invention.

Figure 1:
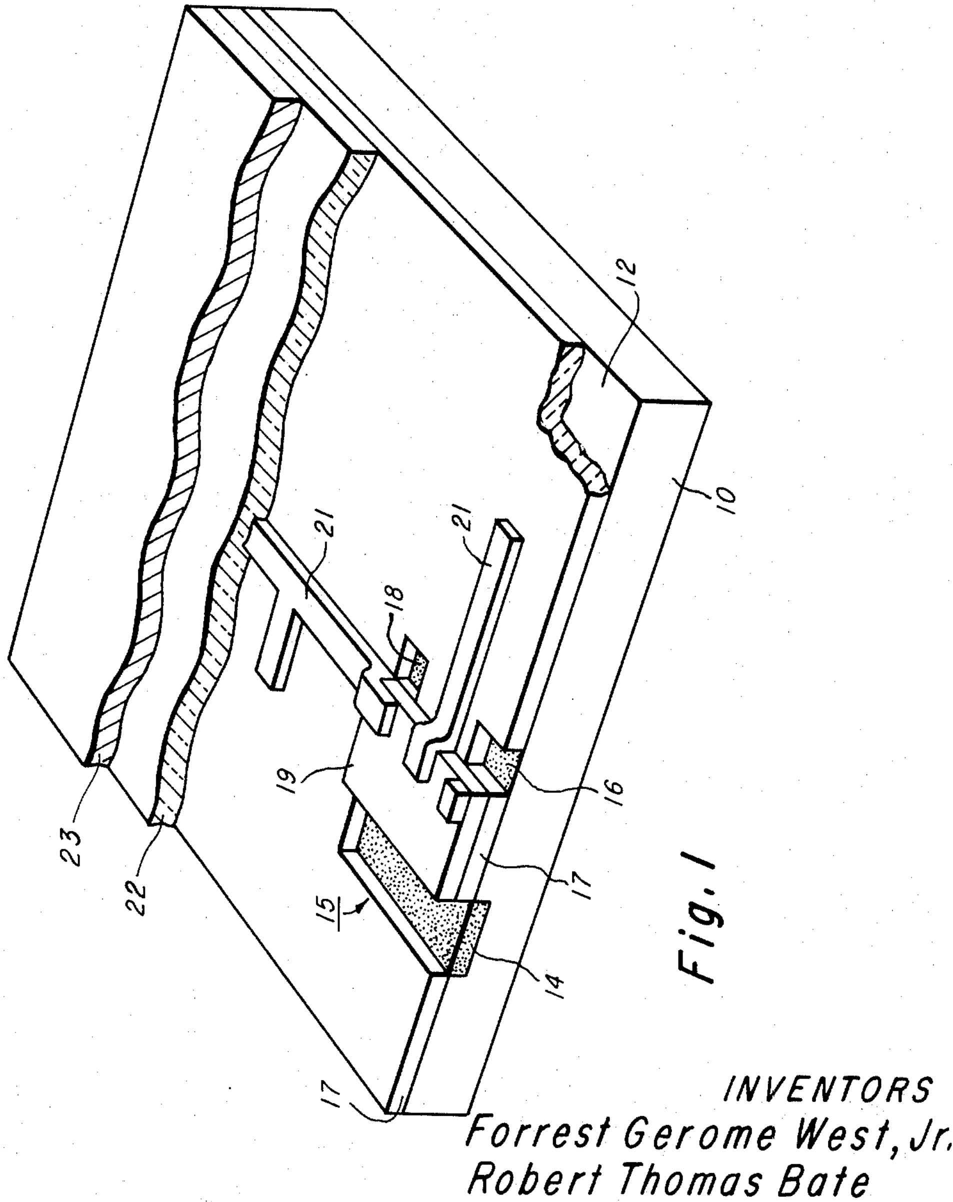

In FIG. 1, a portion of a magnetic bubble memory structure of one embodiment of the present invention is depicted. A semiconductor substrate 10 suitable for IGFET device fabrication may comprise, for example, a slice of n-type silicon preferably having a resistivity in the range of 1–10 ohms-cm. Conventional IGFET masking, diffusion and metallization fabrication techniques may be utilized to form the semiconductor elements on the surface 12 required to accomplish the desired logic functions of the memory system. The devices for gain, impedance conversion, shaping and strobing are preferably formed around the periphery of the substrate 10. For purposes of clarity only one IGFET device, shown generally at 15, is depicted in FIG. 1.

An insulating layer 17, such as silicon dioxide, is formed to overlie the surface 12 of the substrate. By conventional masking and diffusion techniques, a source diffusion is formed in the region 14 and two drain regions are formed at 16 and 18. Metallization is then effected to form the gate 19. At this point it may be desirable to form a passivating layer (not shown) over the IGFET devices. As may be seen, forming the IGFET devices as above described is compatible with batch fabrication techniques.

A predetermined pattern of propagating structures for generating, erasing and positioning the magnetic bubbles is formed to overlie the IGFET devices. With reference to FIG. 1, propagating structures for controlling the position of the magnetic bubbles are shown generally at 21. The propagating material may, for example, comprise a magnetic film such as Permalloy, i.e., nickel-iron alloys or nickel-cobalt alloys. Also, patterned conductive elements such as gold and aluminum could be utilized. It is noted that, since the patterned propagating structures may be formed by single layer deposition techniques, registration problems are minimized. It may be desirable to form a layer of material 22 to overlie the propagating paths and IGFET devices 15 in order to protect the structure and function as a spacer. For example, a spacing between the propagating pattern 21 and the layer of magnetic material 23 on the order of 2 microns or less is preferable. This spacing may be achieved by forming a layer 22 of, for example, silicon oxide or other insulating material to the desired thickness. A layer 23 of magnetic bubble material is secured to the substrate 10 and elements formed thereon so that the layer 23 overlies the propagating pattern 21. The material 23 must be capable of supporting cylindrical magnetic domains and may, for example, be glued to the exposed surface of the layer 22 or, if the layer 22 is not utilized, to the exposed surface of the IGFET devices, propagating structures 21 and oxide layer 17. Suitable material for the layer 23 includes platelets cut from rare earth orthoferrite crystals having uniaxial anisotrophy with the easy magnetic axis perpendicular to the platelet, and epitaxial layers of ferro-magnetic materials. Preferably, the layer 23 comprises magnetic garnets such as rare earth aluminum and gallium substituted iron garnets. Suitable materials for the layer 23 are described in more detail in Gianola et al, IEEE Trans. on Magnetics MAG–5, p. 558 (1969), Bobeck et al, Appl. Phys. Letters 17, p. 131 (1970) and Van Vitert et al, Mat. Res. Bull. 5, p. 825 (1970).

In one aspect of the invention, a silicon slice is used as the substrate 10 and conventional IGFET technology is utilized to form magnetic field sensors on the surface 12. Additionally, amplifiers and logic circuitry are formed on the periphery of the silicon slice. Using such an arrangement, 10 IGFET magnetic field sensors per square inch, for example, may be utilized to handle on the order of $10^6$ bits of information. The number of detectors utilized will depend, of course, on the desired speed of operation, cost, etc.. The pattern for propagating the bubbles, either passive magnetic films or conductors, is deposited directly on the silicon slice, the surface of which has been adequately passivated with silicon oxide or the like. The bubble material 23, preferably magnetic garnet, need only be brought into mechanical contact with the propagating structures 21 in order to form a complete memory plane capable of performing logic operations. Since the bubbles propagate in the layer 23 and not in the silicon 10, the proximity of the layer 23 to the silicon 10 only need be such that the necessary magnetic field interaction between the bubbles, sensors, propagating structure and bubble generators is effected. Electrical connections to the memory structure may be effected in accordance with techniques well known to those skilled in the semiconductor art.

A magnetic memory structure as depicted in FIG. 1 has the advantage of producing relatively large output signals responsive to the presence of a magnetic bubble, and thus provides a good signal to noise ratio. Further, the small number of active devices required per slice assures a high yield. Additionally, since the material 23 in which the bubbles propagate is independent of the silicon slice 10, it is possible to position the pattern 21 on the surface 12 away from defects in the magnetic material 23, thus greatly increasing the yield of magnetic material 23 and eliminating the requirement of forming devices on the material 23 to determine its quality. Similarly, maximum use may be made of the magnetic material 23 since no peripheral devices or contacts are required on the material 23 itself.

With reference now to FIGS. 2 and 3, the principles of manipulating magnetic bubbles via T and bar patterned magnetic films to effect logic functions in accordance with one aspect of the present invention will be described. T and bar patterned magnetic films are described in more detail in Perneski, Propagation of Cylindrical Magnetic Domains in Orthoferrites, IEEE Transactions on Magnetics, Vol. MAG-5, No. 3, September 1969. As explained previously, bubbles are magnetic domains in the form of circular cylinders which are stable entities in appropriately thin materials, possessing predominately uniaxial anisotropy when a suitable d.c. magnetic bias field is applied. The axis of the domain, the anisotrophy axis and the bias field direction are collinear with the normal to the thin material or platelet. When the bias field is less than a critical level the domains tend to elongate first into elliptical cylinders and then into more complex serpentine shapes as the field is lowered further. As the bias field is increased above this lower critical field, the cylindrical domains shrink until an upper critical field is reached, where the bubble abruptly collapses. These critical fields are determined by the magnetic parameters of the material and the thickness of the platelet. Bubble generation and propagation are effected when suitable localized perturbations to the bias field are introduced in a controlled manner. These perturbations may be produced by either appropriately shaped current carrying conductors or appropriately shaped magnetic film patterns at the surface of the platelet. In the case of patterned conductors, control is effected by appropriate sequences of current pulses. In the case of patterned magnetic films, control is effected by a continuously or digitally rotated magnetic field parallel to the surface of the platelet. The rotating field serves as a reference for processing information. The magnetic field perturbations producing propagation result from the magnetic poles at the edges of the magnetic films.

Figures 2A, 2B, 3A, 3B:
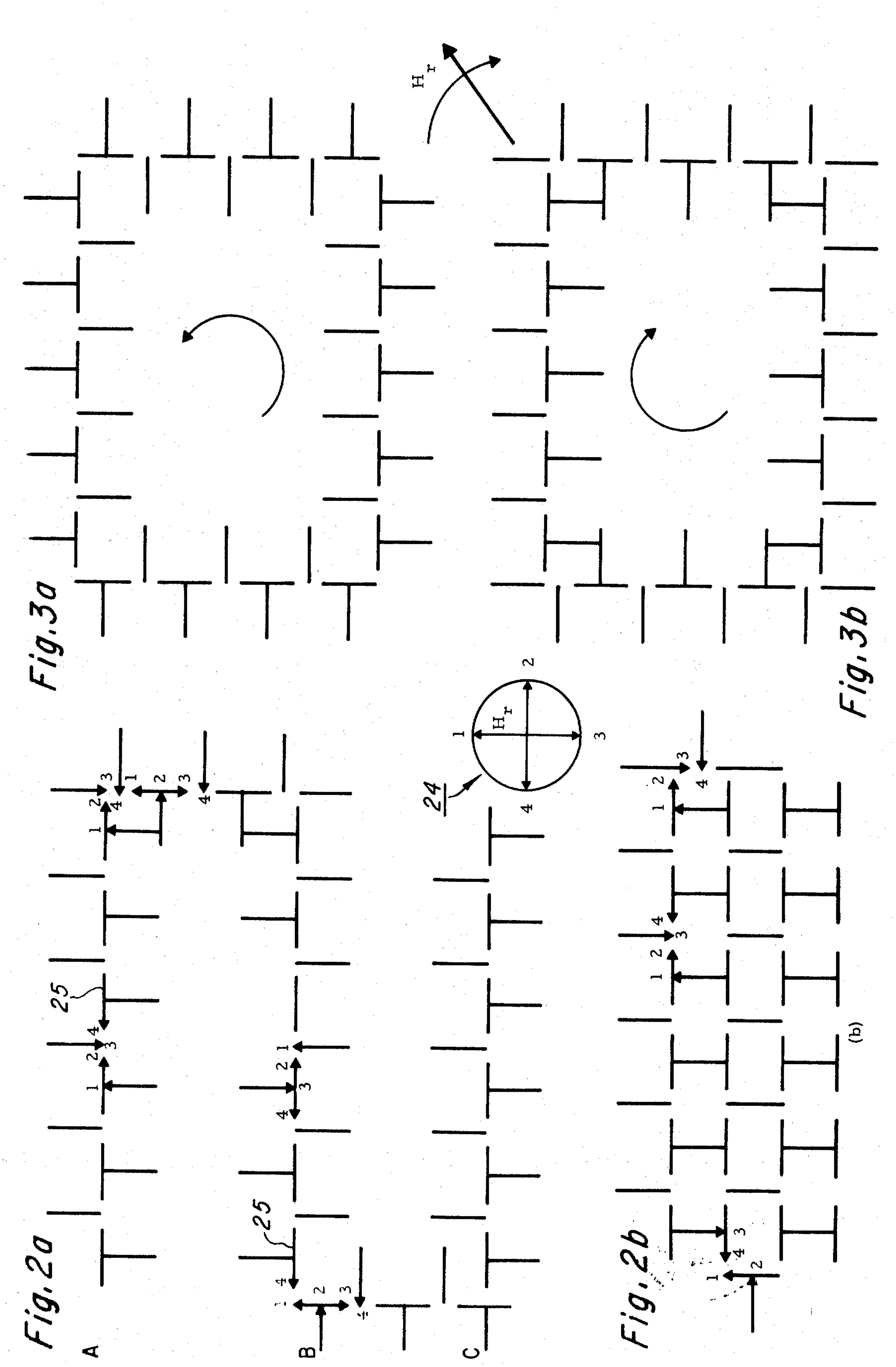

With reference now to FIGS. 2*a* and 2*b*, a coplanar clockwise rotating magnetic field $H_r$ is illustrated generally at 24 in four mutually orthogonal positions corresponding to the four directions in which it is possible to magnetize the long dimensions of the T's and bars. It is assumed that $H_r$ is small enough so that, due to a large demagnetizing field, little magnetization occurs along the width of the T's and bars, yet large enough to magnetize along the length. The magnetic field $H_r$ is preferably supplied by external coils.

A suitable arrangement of external coils for producing the rotating magnetic field $H_r$ is depicted in FIG. 12*a*. With reference to FIG. 12*a*, a magnetic memory structure is depicted at 140. This structure, for example, may be similar to that illustrated in FIG. 1 and may include a plurality of "stacked" memory planes as illustrated in FIG. 11. A first pair of coils 141 and 142 provides a magnetic field, shown generally by the double tipped arrow 145, perpendicular to the plane of the coils. A second pair of coils 143, 144 provides a magnetic field, shown by the double tipped arrow 146, perpendicular to that produced by coils 141 and 142. Preferably, each pair of coils are interconnected so that the same current flows in the winding of each coil. The coils may be driven by digitally sequencing pulses or by a.c. currents 90° out of phase. The tips of the arrows 145 and 146 are numbered 1, 2, 3 and 4 to correspond to the direction of magnetic field illustrated by like numerals for the magnetic field $H_r$ shown at 24 in FIG. 2.

Coils 141 and 142 are connected to a current source 147 and coils 143 and 144 are connected to a current source 148. Each pair of coils is grounded as shown at 149.

A continuously rotating magnetic field $H_r$, such as shown at 24 in FIG. 2 may be produced by the sequence of current pulses illustrated in FIG. 12*b*.

A d.c. bias field perpendicular to the plane of the memory structure 140 is required for stability of the magnetic domains. This bias field may, for example, be supplied by bias current to appropriately disposed coils or by a permanent magnetic structure such as depicted at 150 and 152 in FIG. 12*a* which produces a d.c. bias field in the direction of arrow 154.

FIG. 2*a* depicts an arrangement for propagation of bubbles in opposite directions along paths A and B and means for turning corners and connecting paths A, B and C. The geometry depicted in FIG. 2*a* provides uninterrupted propagation for long distances without changing the sense of rotation of $H_r$. Assume, for example, that a cylindrical domain is of such polarity that it is attracted to the tips of the arrows shown generally at 25 in FIG. 2*a*. Then, along path A, a domain initially at position 1 will advance from left to right to the locations 1, 2, 3 and 4 as the magnetic field $H_r$ advances to corresponding positions 1, 2, 3 and 4. Along path B, the T-bar pattern is inverted about the horizontal direction such that a domain initially at position 1 advances from right to left.

With reference to FIG. 2b, there is depicted a close-packed structure in which the T's along adjacent paths have been joined to form I's. This structure is preferred for maximum bit density. Again, positions 1, 2, 3 and 4 depict the sequence of bubble propagation for a magnetic field $H_r$ rotating clockwise.

With reference now to FIGS. 3*a* and 3*b*, there is depicted complementary T-bar patterns for providing propagation of magnetic bubbles over closed paths with opposite senses of propagation with the magnetic field $H_r$ rotating clockwise. The sense of propagation is counterclockwise in FIG. 3a and clockwise in FIG. 3*b*. Bubbles once inserted will remain in the closed ring unless otherwise disturbed.

FIGS. 2 and 3 depict various structures that may be utilized to control propagation of the magnetic bubbles. Means are required, however to generate the bubbles in the first instance. Bubble generation may be considered in two separate steps; namely, initiation and replication. The bubble initiation step, that is, getting the initial bubble on the replicator, may be effected by first increasing the bias field to clear the platelet of all the domains and then, upon lowering the bias field to the range of domain stability, a bubble may be nucleated by means of a coplanar conducting loop which is used to produce a localized field sufficient to cause the magnetic moment to flip 180° in a region the size of a bubble. Replication is a process of beginning with a single bubble and writing into the propagation path by repeatedly splitting the bubble. Various replicators are described in more detail in A. J. Perneski, IEEE Trans. on Magnetics MAG-5, p. 554 (1969).

In a memory system, it is also necessary to selectively erase the bubbles. This process is most easily implemented by means of a suitably placed coplanar conducting loop to provide a pulsed magnetic field which increases the bias field in the region of the domain to the point of collapse.

In the memory system of the present invention, the bubble initiation, replication, manipulation and erasing may be accomplished as above described. To complete the system, however, it is necessary to detect the presence or absence of a magnetic bubble. As pointed out previously, detection of the small magnetic bubbles in magnetic garnet has been a major problem associated with magnetic bubble memories.

In accordance with one embodiment of the present invention, detection is effected by a structure that utilizes the Hall effect in the inversion layer of what is essentially an IGFET transistor having a multiple drain configuration. The detector is very sensitive to magnetic fields normal to the plane of the inversion layer. Such structures are described in more detail in Fry et al, IEEE Transactions on Electron Devices, ED–16, p. 35 (January 1969).

Figure 4A:
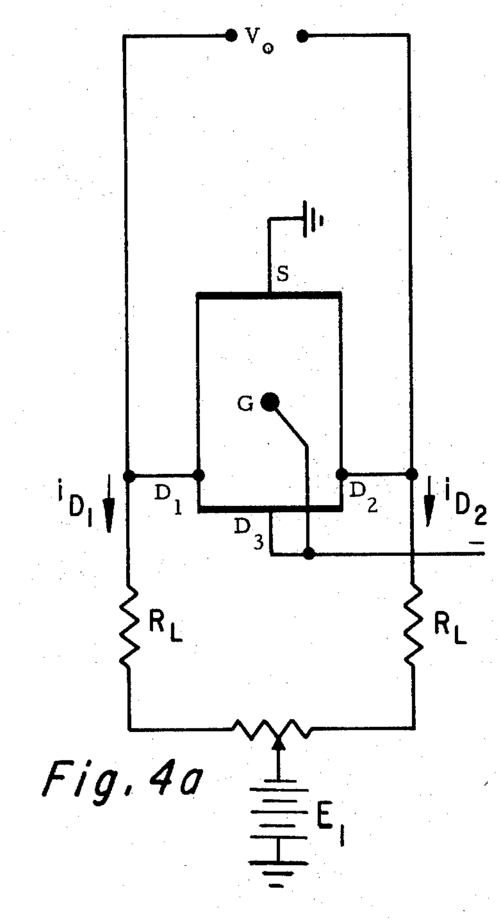
Figure 4B:
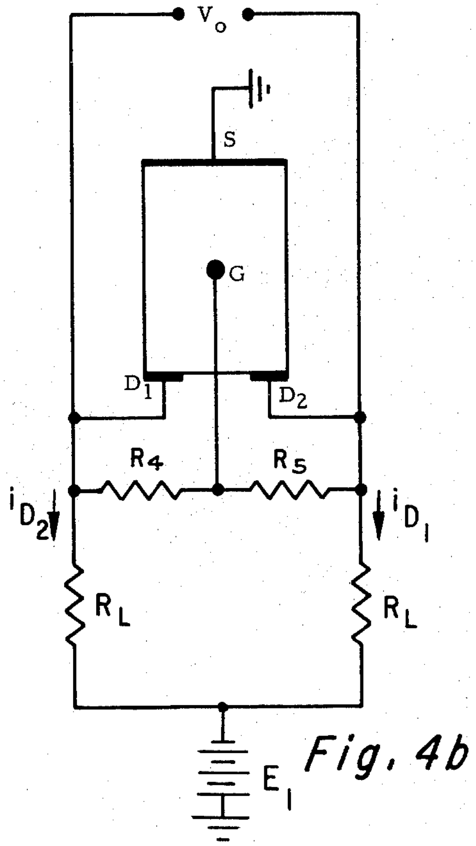

With reference to FIG. 4*a*, there is schematically depicted a magnetic field detector in which increased sensitivity is effected by using a conductive inversion layer produced by a gate electrode in a three drain IGFET. The improvement in sensitivity results from the ability of the inversion layer to sustain larger voltages than can a diffused region for the same power dissipation. A further improvement may be obtained by operating the device at saturation, i.e., beyond "pinch-off" and locating the Hall sensitive drain in the high electric field pinch-off region near the ordinary drain electrode. A two drain modification of this device may also be utilized. Such a structure is schematically depicted in FIG. 4*b*.

Figure 4C:
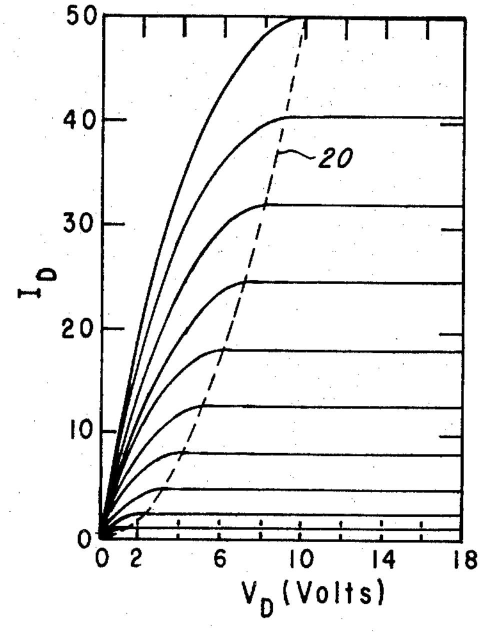

Other advantageous results may be obtained when detecting magnetic fields by operating the device near the threshold condition of the drain characteristics of the IGFET. Typical drain characteristics of an IGFET are shown in FIG. 4*c*. The "pinch-off" point is shown by the dotted line 20, the locus of $V_{DSAT}$. The saturation region is to the right of the pinch-off line, that is, higher $V_d$ values. Threshold operation is obtained by biasing the gate such that the device just begins to conduct. Such operation significantly increases sensitivity and signal to noise ratio and reduces power dissipation. These advantages may be seen with reference to FIG. 4*d* wherein there is a graph 26 of the sensitivity as a function of output voltage in millivolts versus gate voltage near threshold. A drain voltage of 60 volts was applied to a large area three drain IGFET having a threshold voltage $V_T$ of about −5 volts. A magnetic field of 200 gauss was present. For the indicated parameters, a maximum sensitivity of 28 mv/k-gauss is produced. At this point, the power dissipation is only about 6 milliwatts as shown by the curve 27.

Figure 4E:
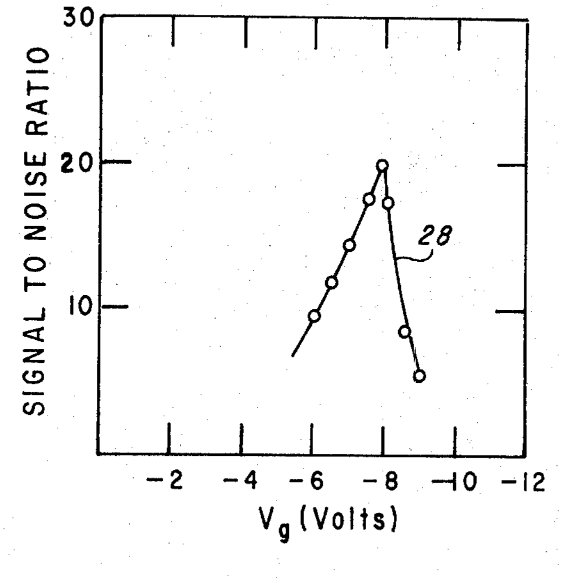
Figure 4D:
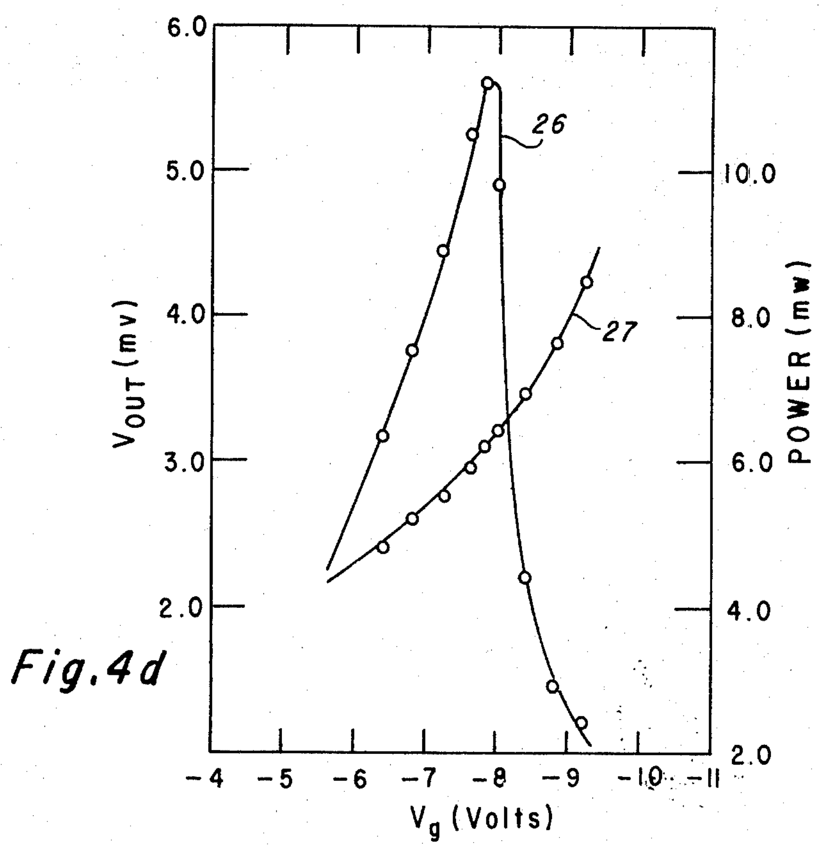

With reference to FIG. 4*e*, there is plotted at 28 a graph of signal to noise for near threshold operation of the above described device. A magnetic field of 50 gauss was applied and the a output signal was detected within the frequency band of 10–100 KHz. As may be seen, a maximum signal to noise ratio is obtained near threshold operation.

For convenience, the detectors are described hereinafter as operating at the "pinch-off" point in the drain characteristics of the IGFET. It is understood, of course, that it may be advantageous to operate the device at saturation or near threshold, as previously described.

Operation of the detector depicted in FIG. 4*a* will now be described. In the absence of a magnetic field, minority holes flow from the source S into the three drain regions D1, D2 and D3, respectively, via the inversion layer underlying the gate electrode G. Because of the symmetrical placement, the Hall drains D1 and D2 are at essentially the same potential, and no output voltage is observed. If a magnetic field is directed out of the plane of the figure, hole carriers are diverted toward D2 and away from D1 causing the drain current through D2 to increase and that through D1 to decrease. Since all three drains are at nearly the same potential as the gate, the channel is "pinched-off" near the drain, and the electric field is large in this region. Thus, the potential difference between D1 and D2 created by the unbalanced drain current is also large, producing good sensitivity.

With reference to FIG. 4*b*, a two drain device is schematically depicted. A voltage divider $R_4$ and $R_5$ may be used to balance out the signals due to the static bias field produced by the voltage source schematically illustrated as a battery $E_1$, although this may not be necessary for memory operation since the signal resulting from a propagating bubble is a pulse. The potential $E_1$ supplied to the devices shown in FIGS. 4*a* and 4*b* may, for example, be on the order of approximately 30 volts, producing a differential output on the millivolt level.

Figure 5:
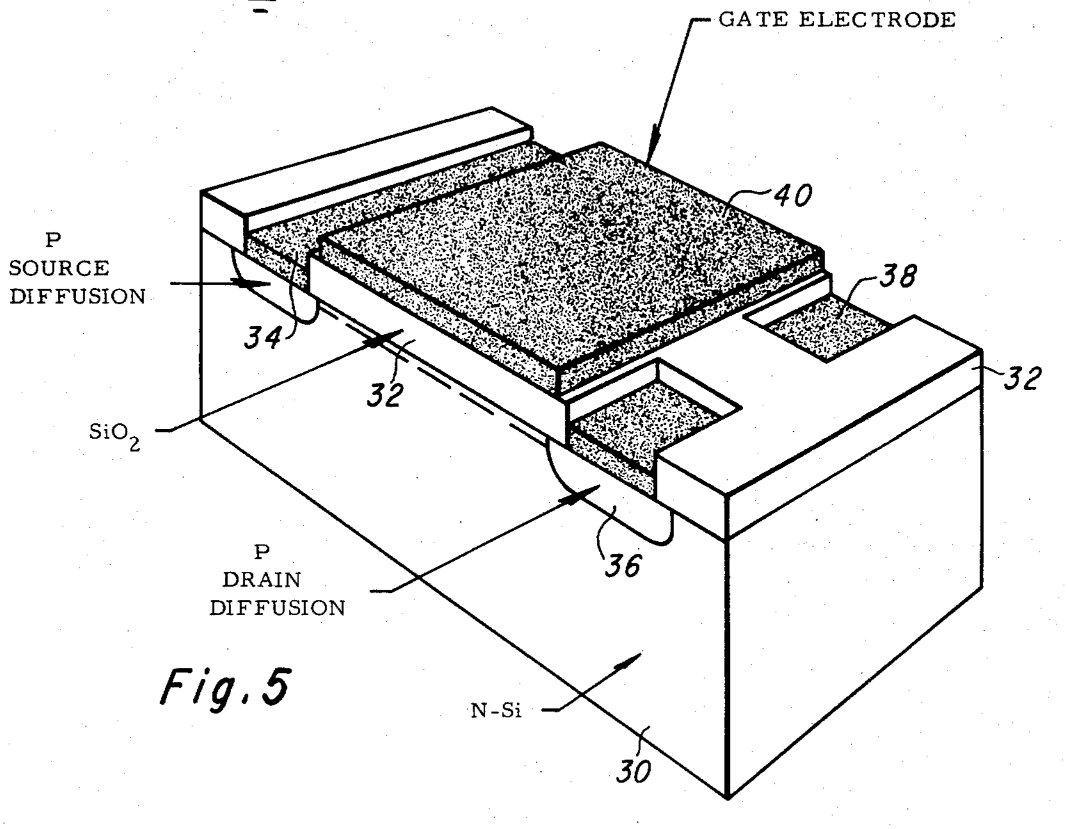

With reference to FIG. 5, there is pictorially depicted a two drain IGFET detector which may be utilized in accordance with the present invention. The device shown in FIG. 5 may be fabricated in accordance with conventional IGFET technology. For example, a substrate 30 of n-type silicon may be utilized. An insulative layer 32 of, for example, silicon dioxide is formed to overlie the surface of the substrate 30. By conventional masking and etching techniques, p-type diffusions are effected to define the source region 34 and the two drain regions 36 and 38. Utilizing conventional metallization techniques, the gate electrode 40 is then formed. An oxide layer on the order of 5,000 angstroms in thickness (not shown) may be formed over the surface of the device to protect it if desired.

Figure 6:
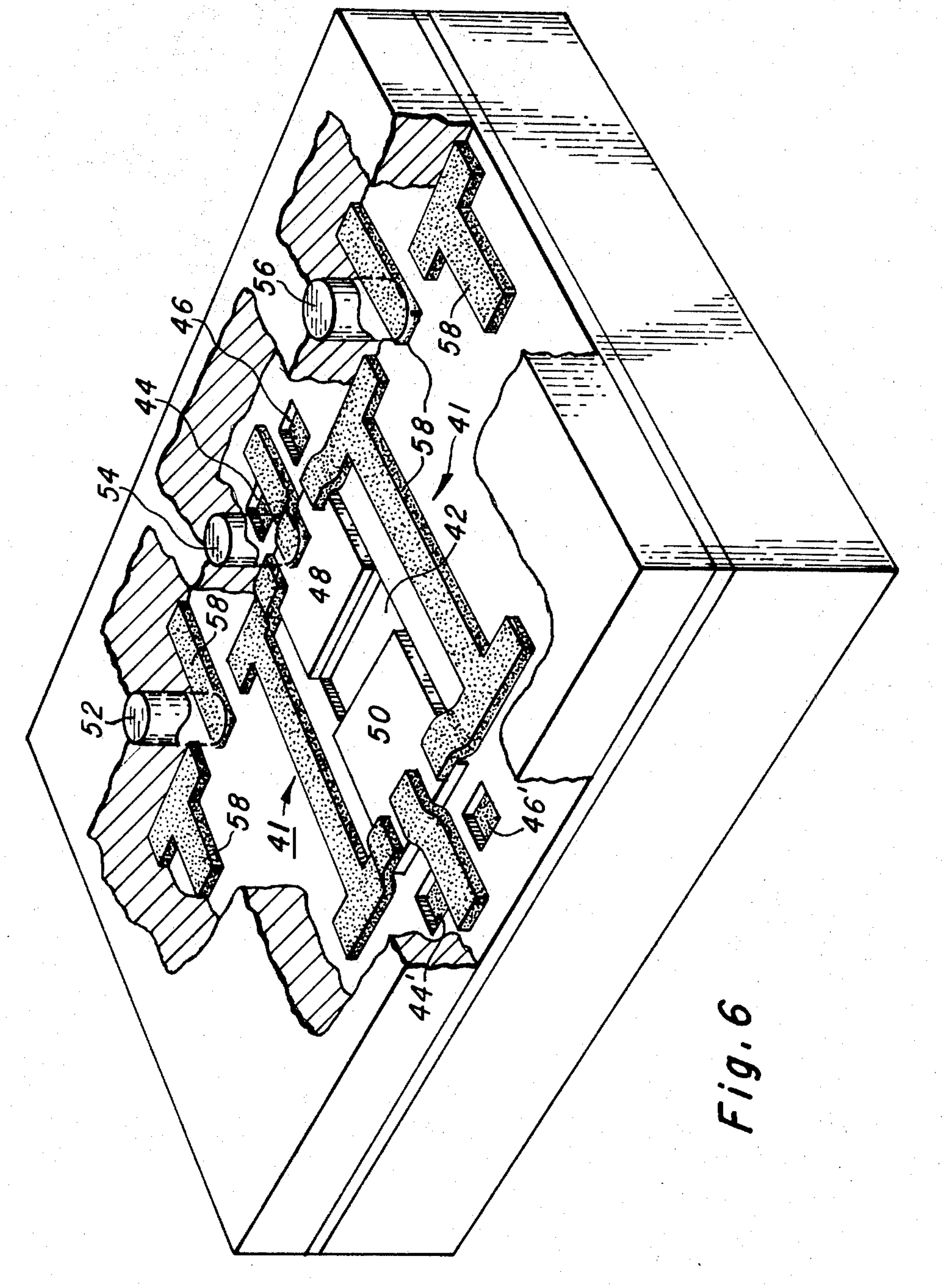

To minimize unwanted signals from the alternately magnetized T's and bars, for example, reference FIG. 3, the magnetic field distributions about the T's and bars must be considered. It may be desirable, therefore, to use two devices to form a magnetic field detector, one device symmetrically placed with respect to the other and with respect to a dummy T-bar structure to provide cancellation of unwanted signals. One configuration that may be utilized in accordance with the present invention to effect such cancellation is shown in FIG. 6. An IGFET detector is depicted generally at 41 and comprises a common source electrode 42 with symmetrically placed drain electrodes 44, 44', 46 and 46'. The gate electrodes are shown respectively at 48 and 50. Cylindrical domains positioned at the tips of bars are pictorially depicted at 52, 54 and 56.

Propagating structures (T's and bars) are shown generally at 58. In the region of the detector 41, the T's have been extended to form I's, producing a dummy T-bar structure overlying the gate 50.

Figures 7, 8:
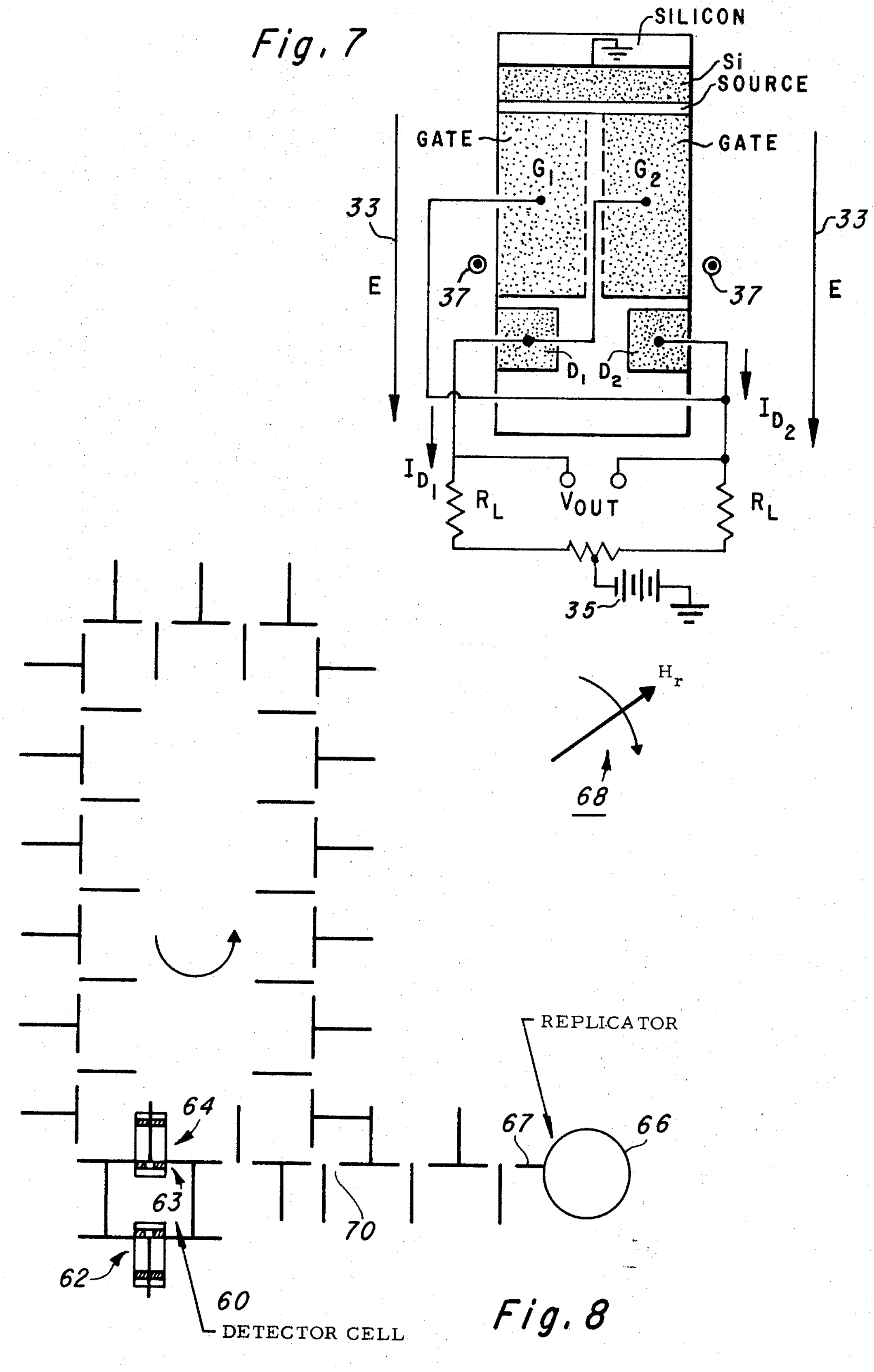
FIG. 7 is a schematic of an IGFET magnetic field detector having a split gate that may be utilized in the memory system of the present invention.
FIG. 8 is a schematic of a ring store configuration embodiment of the memory system of the invention.

With reference to FIG. 7, there is schematically depicted an improved IGFET magnetic field sensor which makes use of the amplification available in a field effect transistor structure.

Negative potentials are applied to the gates $G_1$ and $G_2$, respectively, to produce an inversion layer under each gate at the metal/insulating layer interface. Further, a negative potential is applied to the drain regions, shown generally at $D_1$ and $D_2$, producing a longitudinal electric field in the direction shown by arrows 33 between the source and drain. Preferably, the device is biased to operate in the saturation region of the drain characteristics of the IGFET. A negative gate voltage in the range of −6 or −7 volts with a negative drain bias on the order of −30 volts d.c. may, for example, be desirable.

In the embodiment illustrated, gates $G_1$ and $G_2$ and drains $D_1$ and $D_2$ are at the same potential, determined by the voltage source shown schematically at 35, when no magnetic field is present. It may be seen that this structure in essence defines two separate IGFET's, one device including $D_1$, $G_1$ and the source $S_1$ and the other device including $D_2$, $G_2$ and the source $S_1$. The gates of these two devices are formed sufficiently close to each other such that they advantageously interact in response to a magnetic field to produce an enhanced output signal as follows. When a magnetic field is applied so that it is directed out of the sheet of the drawing, as schematically illustrated by the circled arrow tips at 37, holes in the inversion layer under $G_1$ are diverted from left to right to the inversion layer under $G_2$ by the force due to the combined effects of the electric field and the magnetic field. As a result, the drain current $I_{D2}$ increases while the current $I_{D1}$ decreases. The phenomenon by which charge is transferred from the inversion layer under $G_1$ to the inversion layer under $G_2$ by the combined effect of the electric and magnetic fields present is characterized herein as magnetically induced charge coupling. The cross-connections of the drains $D_1$ and $D_2$ to gates $G_2$ and $G_1$, respectively, provides positive feedback which produces an enchanced output signal. Varying the external load resistance $R_L$ affects the sensitivity and stability of the IGFET magnetic field detector and, depending upon the design and intended use, an optimum value of $R_L$ may exist. For example, to increase sensitivity, the value of $R_L$ is increased, but from a stability viewpoint, the value of $R_L$ should preferably be limited to less than $1/g_m$ where $g_m$ is the transconductance of the device.

The split gate magnetic field detector is described in more detail in copending application Ser. No. 129,422, entitled MAGNETIC FIELD SENSOR, filed concurrently herewith and assigned to the same assignee.

With reference to FIG. 8, there is schematically depicted some of the elements of a ring store utilizing a T-bar configuration and containing 17 bits. A magnetic field detector is shown generally at 60 and comprises two IGFET devices 62 and 64 symmetrically arranged to cancel unwanted signals resulting from the T's and bars. A bubble is detected as it passes over the drain region 63 of detector 64. A replicator is shown generally at 66 and may, for example, comprise a Permalloy disk with a short projection at 67. Such a replicator is described in more detail in A. J. Perneski, IEEE Transactions on Magnetics, MAG–5, (554) 1969. A bubble circulating on the edge of the disk of the replicator 66 as the magnetic field $H_r$ rotates as shown at 68 is caught on the projection 67 and pulled apart when the magnetic field $H_r$ is increased to a critical value for an appropriate fraction of the cycle of the rotation. Writing is accomplished by replicating, after which the bubble proceeds to the left entering the ring at the corner 70 and circulating in a counter-clockwise direction for clockwise rotation of $H_r$. By properly shaping the T's and bars at the point of entry to the ring, a bubble once inserted will remain in the ring unless erased.

Figure 9A:
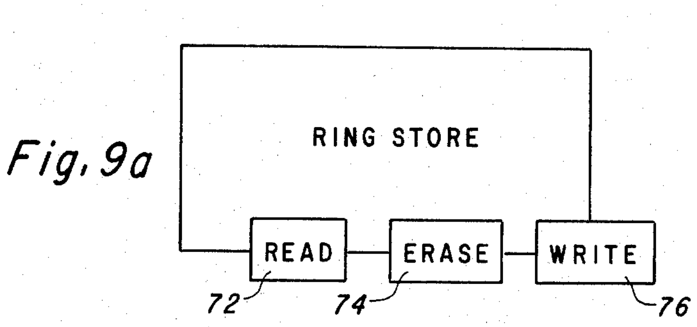
Figure 9B:
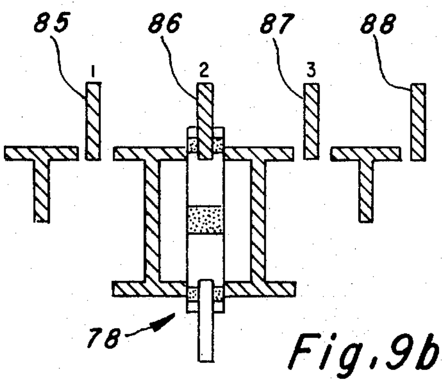
Figure 9C:
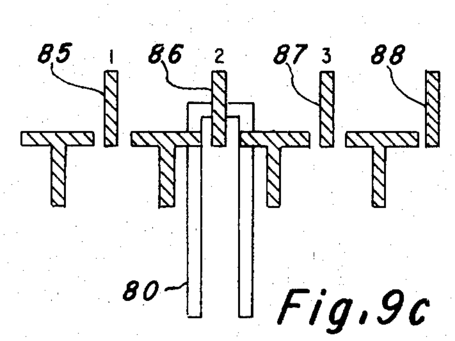
Figure 9D:
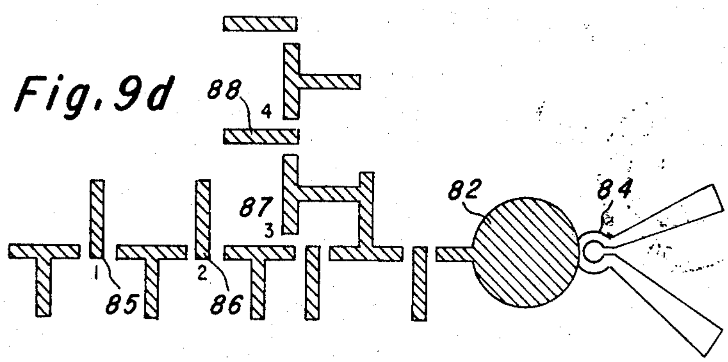

With reference to FIG. 9*a*, there is depicted in block diagram format a ring store in accordance with an embodiment of the present invention having elements for reading 72, erasing 74 and writing 76. Elements 72, 74 and 76 are shown in more detail in FIGS. 9*b*, 9*c* and 9*d*, respectively. The detector 78 comprises a symmetrical design with the common source electrode such as described with reference to FIG. 6. The erasing element 74 may comprise a conducting loop 80 for producing a localized pulse field to cause bubble collapse. The replicator 82 may, for example, be of the disk type described in the aforementioned Perneski article, with a conducting loop 84 for producing a high current pulse field for bubble initiation. The numbers 85, 86, 87 and 88 denote the direction of propagation of magnetic bubbles for clockwise rotation of the magnetic field $H_r$.

Using the general class of elements described in FIG. 9, a computer memory may be effected. The major electronic functions of a memory system in accordance with one aspect of the present invention is depicted in FIG. 10. The start-up operation utilizes a variable bias power supply 100 and bubble initiator 102. The memory structure shown generally at 101 may, for example, be similar to that shown in FIG. 8. For data entry at 106, the desired address is selected with the data desired. When the write command, shown schematically at 108, is given, the bubbles will be arranged as the data dictate. A parallel to serial converter 110 produces the required 1, 0 sequence. Any previous stored data is destroyed automatically via the delay circuit 112 and erase generator 114 while the new word is being inserted by the bubble replicate generator 116. The phase propagation sequence $\phi_1,\phi_2,\phi_3,\phi_4$ and proper synchronization are established by the timing module 118. To read, the same address procedure is used and a read command given. Address selection is effected at 120. The timing module 118 provides an input to an address register 122 which in turn provides an input to the address comparator which compares the input to the address selection entered at 120. The read command is effected at 126 and the sense amplifier 128 is strobed to generate the serial 1,0 sequence corresponding to the bubbles passing the detector in the memory array. This serial data flow is transmitted to the computer 130 for data processing. Stored data may be read and new data inserted simultaneously, if desired.

With reference now to FIG. 11, there is depicted an embodiment of the present invention for stacking memory planes for increasing memory density. In this embodiment, the garnet material 136 is epitaxial and is deposited on both sides of a suitable non-magnetic substrate 138 such as gadalinium gallium garnet ($Gd_3Ga_5O_{12}$). The exposed surfaces of the garnet 136 are mechanically secured to silicon structures 140 having IGFET logic and control elements and magnetic bubble propagating patterns formed as a part thereof, such as, for example, is depicted in FIG. 1.

For purposes of illustration, the present invention has been described as utilizing garnet bubble material and IGFET technology. The present invention also applies in general to any suitable combination of semiconductor processes for large scale integration and magnetic materials capable of supporting and/or propagating magnetic domains or domain walls, and in which the semiconductor supports the necessary structure for generating, sensing and propagating the magnetic entities in the adjacent material. As may be seen from the above detailed description, the various objects of the present invention have been effected. Further, numerous advantages have been provided, including a magnetic memory that produces a large output signal responsive to a magnetic bubble; a magnetic memory system wherein magnetic domains propagate in a material independent from the logic control structure; and a magnetic memory compatible with batch fabrication techniques, wherein registration problems are minimized. While various embodiments have been described in detail herein, it will be apparent to a person skilled in the art that various modifications to the details of construction may be made without departing from the scope or spirit of the present invention.

What is claimed is:

1. A compact magnetic memory structure comprising a plurality of memory units, each unit including:

a. a non-magnetic substrate having first and second expitaxial layers of magnetic garnet material, said first layer being formed on one surface of said substrate and said second layer being formed on a surface opposite said one surface;

b. a first body of semiconductor material having field-effect dector means formed in a first region on a major surface thereof and propagating means overlying a second region on said major surface, said major surface of said first body of semiconductor material being mounted adjacent said first epitaxial layer; and c. a second body of semiconductor material having field-effect dector means in a first region on a major surface thereof and propagating means overlying a second region on said major surface of said second body, said major surface of said second body of semiconductor material being mounted adjacent said second epitaxial layer.

2. A method for fabricating a magnetic memory comprising the steps of:

a. forming field-effect transistor magnetic field detector means in one surface of a semiconductor substrate;

b. forming a propagating pattern to overlie said one surface of said substrate, said propagating pattern being positioned to interact with said magnetic field detector means;

c. positioning a body of magnetic material capable of supporting magnetic domains over said propagating pattern such that only operative areas of said body overlie a propagating structure; and d. mounting said body of magnetic material to said substrate.

3. A method as set forth in claim 2 further including the step of forming a passivating layer intermediate said propagating pattern and said body of magnetic material.

4. A method of fabricating a magnetic memory as set forth in claim 2 wherein said propagating pattern comprises electrical conductors.

5. A method of fabricating a magnetic memory as set forth in claim 2 wherein said propagating pattern comprises a magnetic film.

6. A magnetic memory comprising in combinations:

a. a semiconductor substrate;

b. a body of magnetic material capable of supporting magnetic domains secured adjacent one surface of said substrate;

c. means coupled to said body for generating and controllably positioning magnetic domains therein; and d. detector means for sensing the location of said domains, said dector means comprising insulated gate field effect transistors integrated in said one surface of said substrate.

7. A magnetic memory as set forth in claim 6 wherein said transistors respectively include two gate regions and two drain regions enabling positive feedback, providing a magnetic field detector having amplification characteristics.

8. A magnetic memory as set forth in claim 6 including a passivating layer intermediate said body of magnetic material and said substrate, said passivating layer providing a separation between said body and said substrate to optimize magnetic field interaction therebetween.

9. A magnetic memory as set forth in claim 6 wherein said body of magnetic material comprises an epitaxial layer on a non-magnetic substrate.

10. A magnetic memory as set forth in claim 9 wherein said means for generating and controllably positioning magnetic domains comprises a pattern of conductive elements overlying said one surface of said substrate.

11. A magnetic memory as set forth in claim 10 wherein said means for generating and controllably positioning magnetic domains comprises a patterned magnetic film.

* * * * *